United States Patent
Tucker et al.

(10) Patent No.: US 6,906,915 B2
(45) Date of Patent: Jun. 14, 2005

(54) CHASSIS SYSTEM THAT PERMITS INSTALLATION OF MEDIA DEVICES IN SELECTED ORIENTATIONS

(75) Inventors: Sean W. Tucker, Loveland, CO (US); Arlen L. Roesner, Fort Collins, CO (US); Erick J. Tuttle, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3 days.

(21) Appl. No.: 10/285,858

(22) Filed: Nov. 1, 2002

(65) Prior Publication Data

US 2004/0085724 A1 May 6, 2004

(51) Int. Cl.[7] .................................................. G06F 1/16
(52) U.S. Cl. ........................ 361/685; 361/679; 361/683
(58) Field of Search .................................. 361/684–687

(56) References Cited

U.S. PATENT DOCUMENTS

| 5,208,722 A | | 5/1993 | Ryan et al. |
| 5,236,259 A | | 8/1993 | Ryan et al. |
| 5,748,442 A | * | 5/1998 | Toor ............................ 361/685 |
| 6,075,694 A | | 6/2000 | Mills et al. |
| 6,293,636 B1 | * | 9/2001 | Le et al. ................... 312/223.2 |
| 6,424,523 B1 | * | 7/2002 | Curtis et al. ................ 361/685 |

* cited by examiner

Primary Examiner—Yean-Hsi Chang (57) ABSTRACT

A system and method that enables installation of media devices in a chassis. The chassis has an internal cavity defined by a plurality of walls. Additionally, a first media device has a first external width dimension and a second media device has a second external width dimension. The second external width dimension is different than the first external width dimension. A plurality of mounting features are connected to the plurality of walls to hold the first media device and the second media device in a plurality of orientations relative to the chassis.

29 Claims, 7 Drawing Sheets

CHASSIS SYSTEM THAT PERMITS INSTALLATION OF MEDIA DEVICES IN SELECTED ORIENTATIONS

BACKGROUND OF THE INVENTION

A variety of computer chassis designs are configured to hold certain drives, such as floppy disk drives or CD Rom drives. Additionally, some of these designs allow the chassis to be used in more than one orientation. For example, a computer chassis may be utilized in a desktop orientation or a deskside orientation. However, when the chassis is moved from one orientation to another, the orientation of the drive or drives also changes. In some applications, the reorientation of the chassis results in an undesirable orientation of the drive or drives. Some attempts have been made to permit the position of the drives to be changed relative to the chassis, but the resulting designs generally require drives of the same external dimensions.

SUMMARY

In one embodiment of the present invention, a system is provided for enabling installation of media devices. The system comprises a computer chassis having an internal cavity defined by a plurality of walls. The system further comprises a first media device having a first external width dimension. A second media device has a second external width dimension, the external width dimension being different than the first external width dimension. A plurality of mounting features are connected to the plurality of walls to hold the first media device and the second media device in a plurality of orientations relative to the computer chassis.

Another embodiment relates to a system for facilitating placement of media devices. The system comprises a chassis having a plurality of mounting features, a first media device and a second media device. The second media device has an external width dimension different from that of the first media device. The chassis and the plurality of mounting features enable direct coupling of each of the first media device and the second media device in a plurality of orientations relative to the chassis.

Another embodiment relates to a method for positioning media devices. The method comprises reorienting a first media device within a cavity in a computer chassis from a first position to a second position. The second position is generally perpendicular to the first position. The method also comprises moving a second media device, having a width different from that of the first media device, from a first chassis position in the cavity to a second chassis position. The second chassis position is located within a portion of the cavity vacated by the first media device during reorienting of the first media device.

Another embodiment relates to a chassis. The chassis has a plurality of walls defining a cavity within a main cavity portion and a pair of cavity extensions. The main cavity portion and the pair of cavity extensions are formed generally in a right angle to permit selective insertion of media devices in a plurality of orientations.

BRIEF DESCRIPTION OF THE DRAWINGS

Certain exemplary embodiments of the invention will hereafter be described with reference to the accompanying drawings, wherein like reference numerals denote like elements, and.

DETAILED DESCRIPTION OF EXEMPLARY EMBODIMENTS

Figure 1:
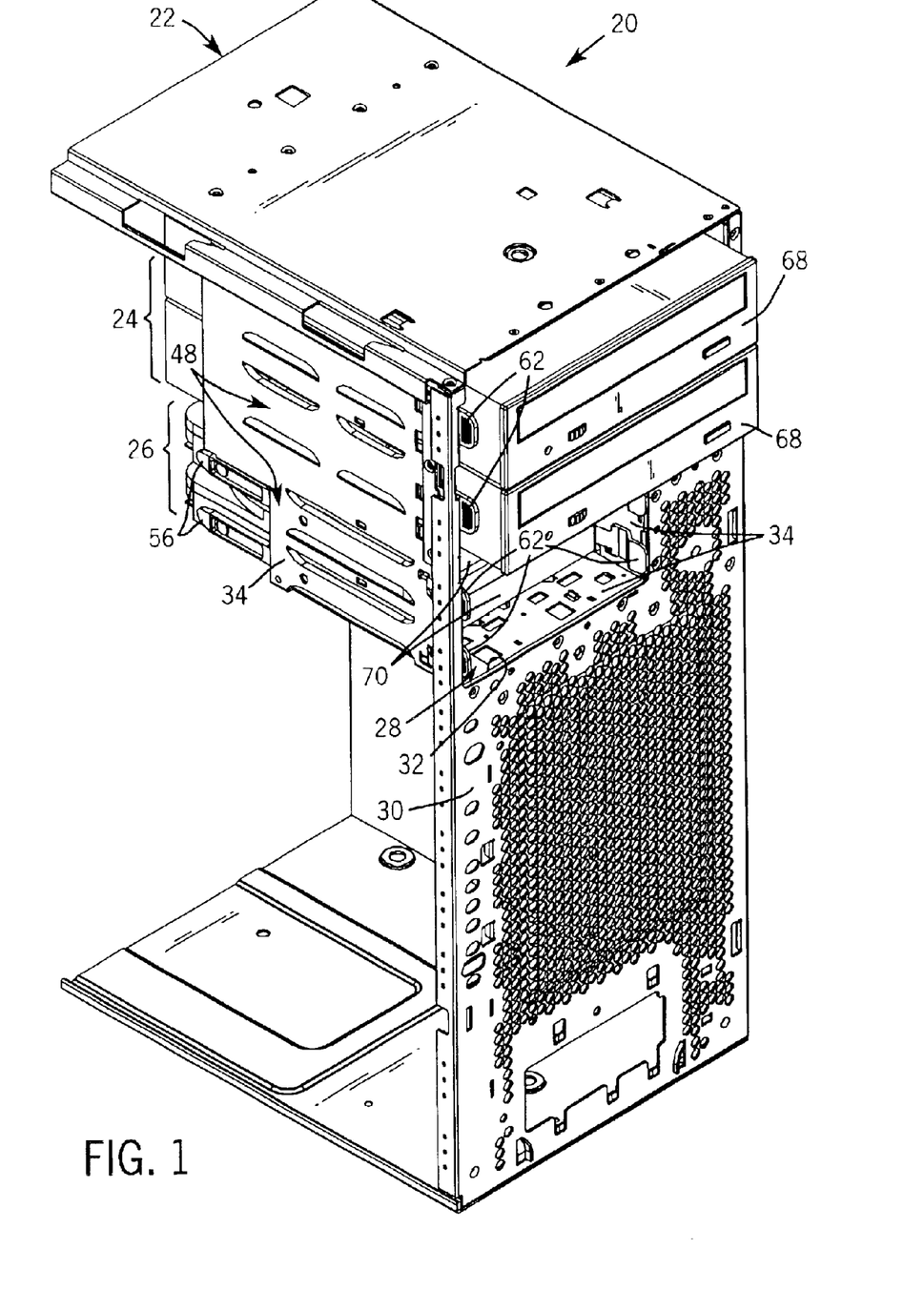
FIG. 1 is a perspective view of an embodiment of a chassis system positioned in an exemplary orientation.

Referring generally to FIG. 1, a system 20 is illustrated according to one embodiment of the invention. Generally, system 20 comprises a chassis 22, such as a computer chassis, and two or more media devices, such as the exemplary media devices 24 and 26.

Media devices 24 and 26 are received in a cavity 28 of chassis 22. The devices 24, 26 are inserted through an outer wall 30 of chassis 22 via an appropriately-sized opening 32 in wall 30. By way of example, outer wall 30 may be a front wall or panel of a computer chassis.

In the embodiment illustrated in FIG. 1, chassis 22 is positioned in a deskside orientation in which the height dimension of outer wall 30 is generally greater than the width dimension of outer wall 30. However, chassis 22 is designed for selective reorientation to a different position, such as the desktop position illustrated in FIG. 2. In the desktop position, the width dimension of outer wall 30, e.g. a computer chassis front panel, is generally greater than the height dimension.

When the orientation of chassis 22 is changed, the previous orientation of media devices 24 and 26 relative to a potential user may be maintained by reorienting or changing their position relative to chassis 22. In the example illustrated, media devices 24 and 26 are rotated approximately 90 degrees with respect to chassis 22 when chassis 22 is moved from the deskside orientation of FIG. 1 to the desktop orientation of FIG. 2. Internal cavity 28 is designed to facilitate the reorientation of media devices 24 and 26 with respect to chassis 22 when at least one external dimension of media device 24 is different than the corresponding external dimension of media device 26.

Figure 3:
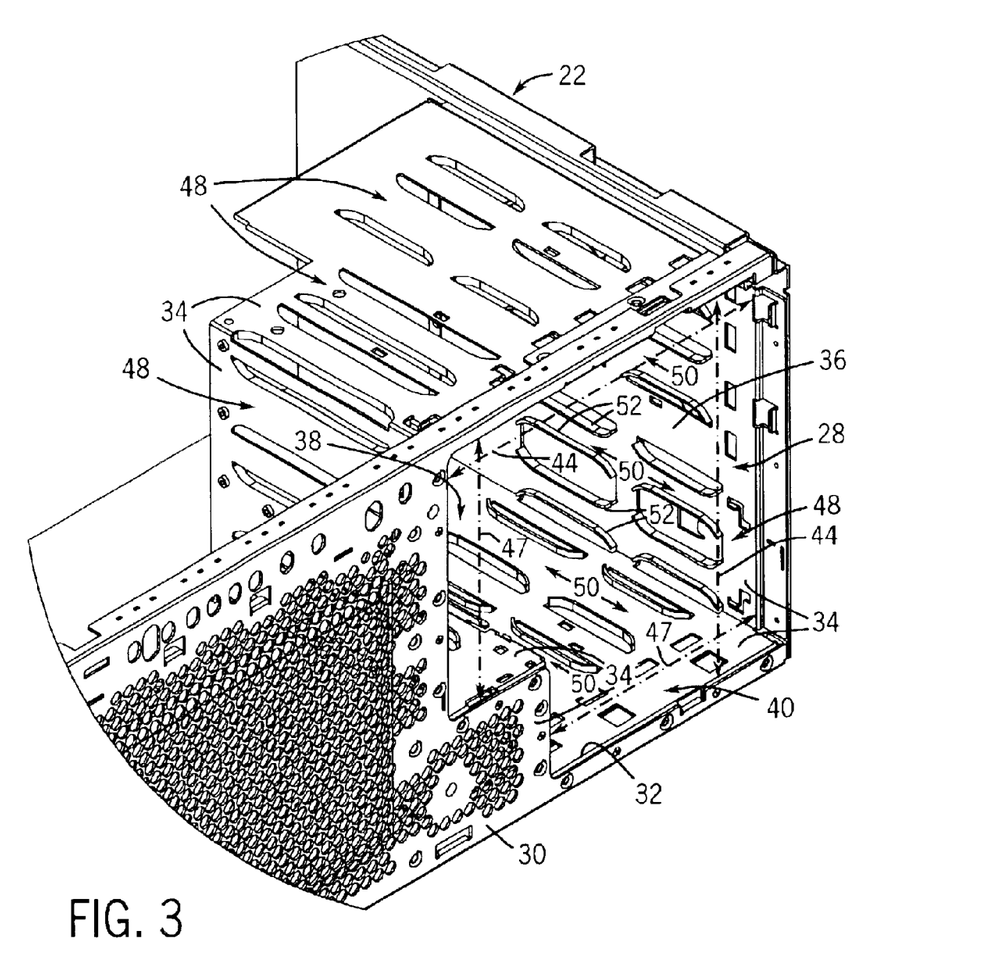
FIG. 3 is a perspective view of the chassis illustrated in FIG. 2 with media devices removed.

As further illustrated in FIG. 3, cavity 28 is generally defined by a plurality of cavity walls 34. In the exemplary embodiment, cavity walls 34 define a main cavity portion 36 and first and second cavity extensions 38 and 40, respectively. Cavity extensions 38 and 40 may be disposed at a variety of angles with respect to each other. However, in the embodiment illustrated, extensions 38 and 40 are disposed generally at right angles with respect to each other to facilitate transition between desktop and deskside orientations. The exemplary configuration of cavity 28 is formed by six cavity walls 34, however the size and shape of cavity 28 may vary depending on the size and type of media devices utilized.

Figure 2:
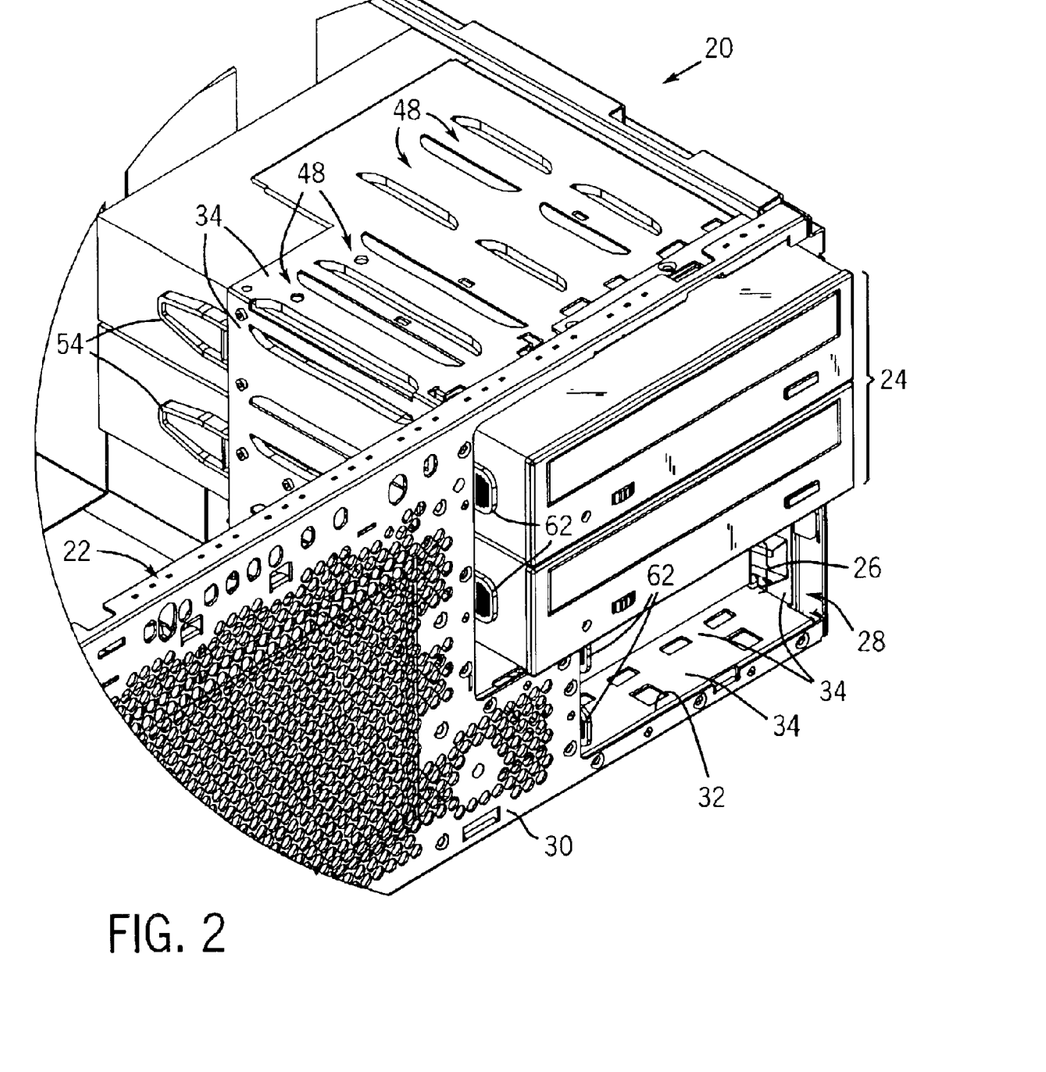
FIG. 2 is a perspective view of the chassis system of FIG. 1 positioned in another exemplary orientation.

In the embodiment illustrated in FIGS. 1–3, the design of cavity 28 facilitates reorientation of media devices 24 and 26 when the external width of media device 26 is different than that of media device 24. For example, media device 24 may have a width 42 (see FIG. 4) that generally corresponds to a dimension 44 extending through main cavity portion 36 and cavity extension 38 or through main cavity portion 36 and extension 40, as illustrated best in FIG. 3. The exemplary media device 26, on the other hand, comprises an external width dimension 46 (see FIG. 4) that generally corresponds to a cavity extension transverse dimension 47 extending across the span of each cavity extension, as illustrated in FIG. 3.

Thus, when chassis 22 is in a first orientation (e.g. see orientation illustrated in FIG. 1), media device 24 is positioned in main cavity portion 36 and cavity extension 40. Simultaneously media device 26 is positioned within cavity extension 38. However, when chassis 22 is reoriented to a position such as that illustrated in FIG. 2, e.g. a desktop position, media device 24 is removed, rotated with respect to chassis 22 and inserted into main cavity portion 36 and cavity extension 38. This reorientation of media device 24 vacates cavity extension 40 to permit insertion of media device 26 therein. Similarly, if chassis 22 is moved from a desktop to a deskside orientation, for example, media device 24 is moved from main cavity portion 36 and cavity extension 38 to main cavity portion 36 and cavity extension 40. This movement vacates cavity extension 38 for insertion of media device 26. The configuration of cavity 28 provides for an efficient use of space that permits the reorientation of media devices when an external dimension, e.g. the external width dimension, is different from one media device to another.

Figure 4:
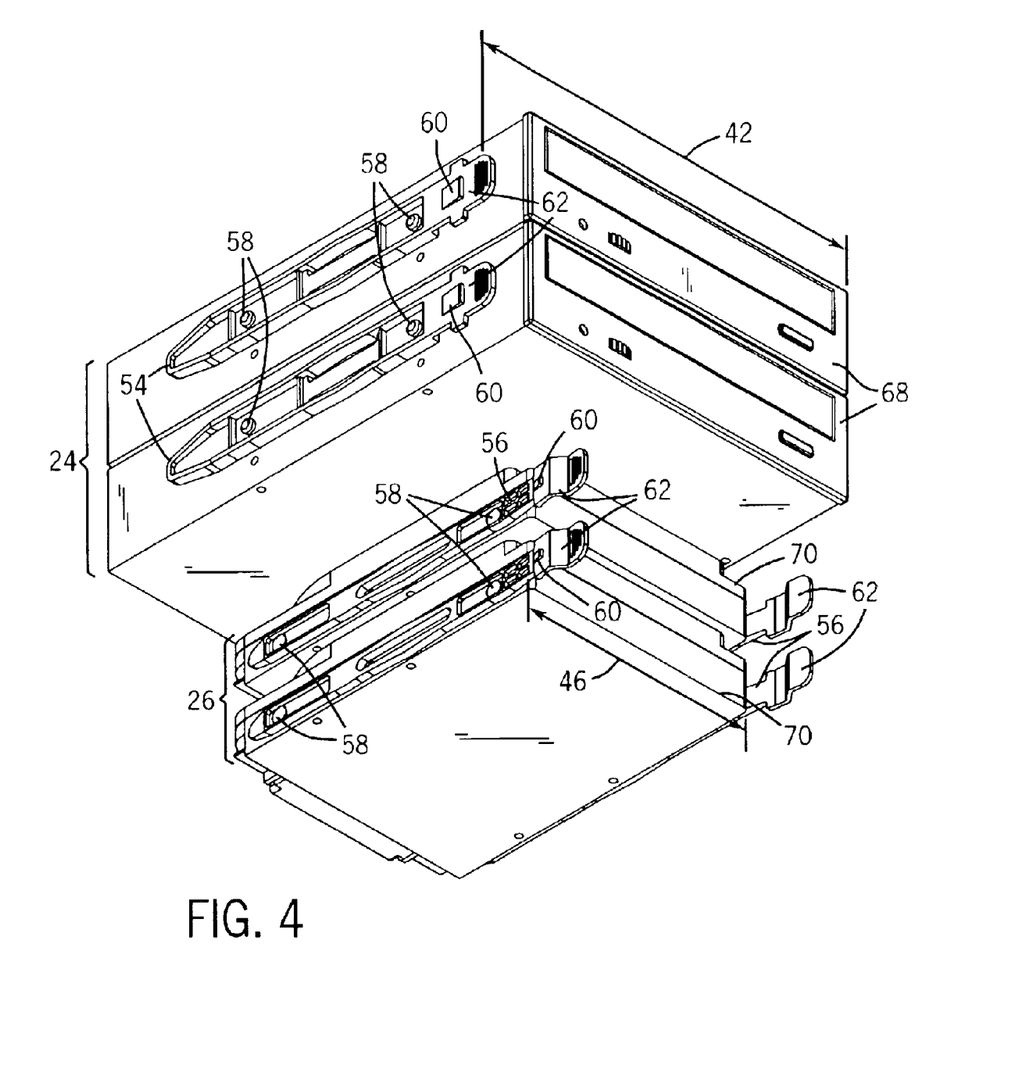
FIG. 4 is a perspective view of exemplary media devices for receipt by the chassis.
Figures 5, 6:
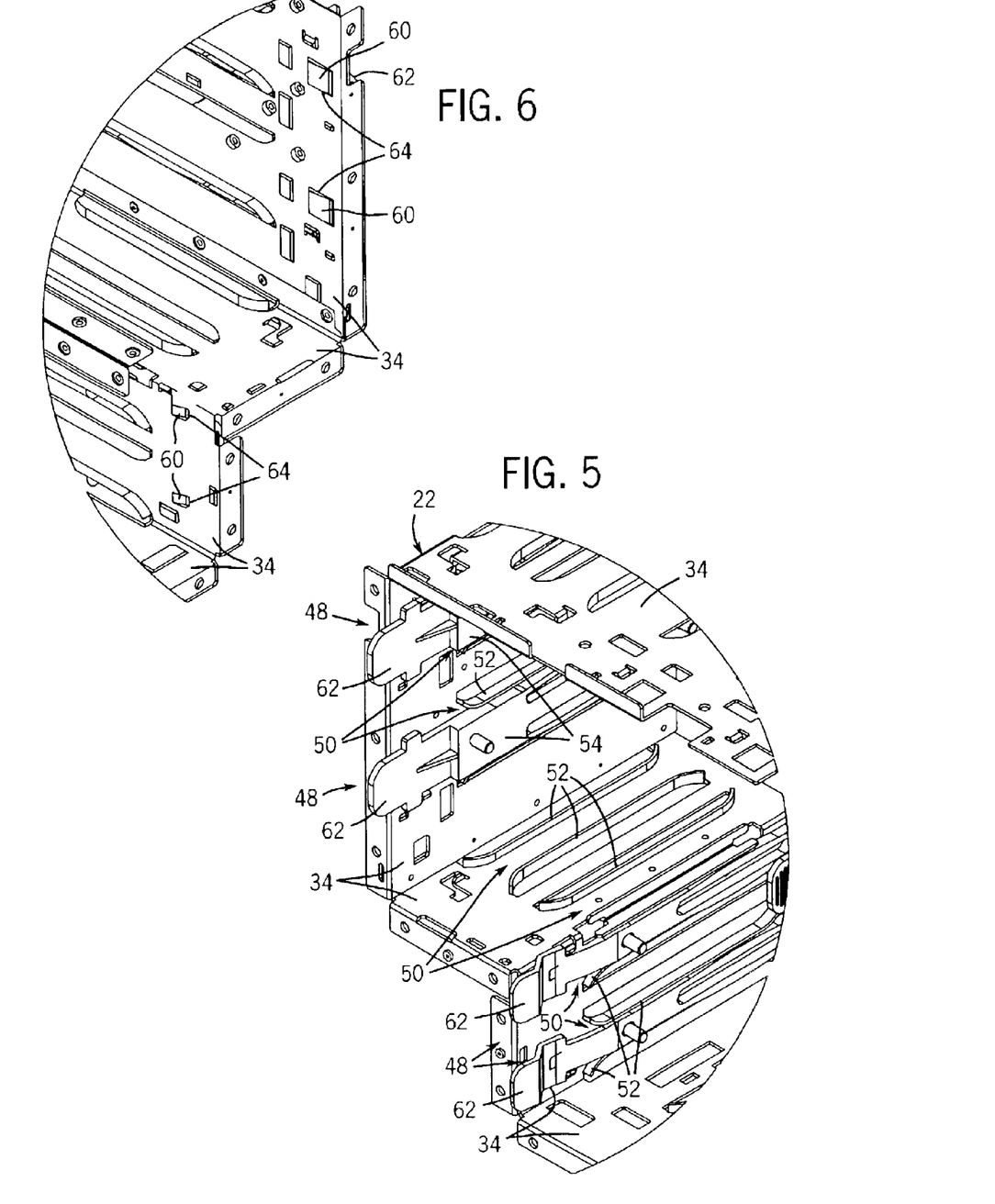
FIG. 5 is a perspective view of a front portion of an embodiment of a chassis illustrating certain mounting features disposed generally within a cavity of the chassis.
FIG. 6 is a perspective view of an exterior region of the chassis illustrated in FIG. 5.

One exemplary technique for removably mounted media devices 24 and 26 within cavity 28 utilizes a plurality of mounting features 48. Mounting features 48 readily permit the removal and insertion of media devices 24 and 26 in any of a plurality of orientations provided by cavity 28. For example, mounting feature 48 may comprise slots 50 formed by features, such as tabs 52, connected to cavity walls 34. Tabs 52 may be formed by bending the material of cavity walls 34 inwardly at appropriate locations to form slots 50. Slots 50 are sized to slidably receive corresponding rails, such as rails 54 of media device 24 and rails 56 of media device 26, as illustrated in FIGS. 4 through 6. Rails 54 and 56 may be similar or dissimilar in design depending on the type and size of each media device as well as the corresponding mounting features. In the illustrated embodiment, slots 50 are appropriately positioned to slidably receive rails 54 and 56 regardless of the orientation of media devices 24 and 26 with respect to chassis 22. Thus, in this example, the media devices may be directly coupled to the chassis 22 in a variety of orientations without additional hardware.

Rails 54 and 56 may be attached to media devices 24 and 26, respectively, by fasteners 58, e.g. rivets, screws, moldable stabs or other fasteners. Additionally, at least one of the rails 54 and 56 may comprise at least one retention feature 60 designed to prevent inadvertent removal or movement of the media devices. In this example, each rail comprises a retention feature 60 in the form of a protrusion mounted on a flexible portion 62 of the rail.

As media device 24 or media device 26 is inserted into cavity 28, slots 50 guide corresponding rails 54, 56 until the media device is fully inserted into cavity 28. As the media device is moved to its fully inserted position, retention features 60 and flexible portions 62 are flexed slightly inwardly until retention features 60 engage corresponding features 64, as illustrated by the external perspective view of FIG. 6. The natural resiliency of each flexible portion 62 moves its retention feature 60 outwardly into engagement with corresponding feature 64. By way of example, corresponding features 64 may be openings or recesses within cavity walls 34 appropriately sized to receive retention features 60.

Once each retention feature 60 and corresponding feature 64 are engaged, outward or disengaging motion of the media device is inhibited. Removal of a media device may be accomplished when a user disengages the appropriate retention features 60 by squeezing corresponding flexible portions 62 inwardly toward the media device. Once the retention features are disengaged, the media devices 24, 26 may be slid out of cavity 28 for reorientation, servicing or replacement.

Figures 7, 8:
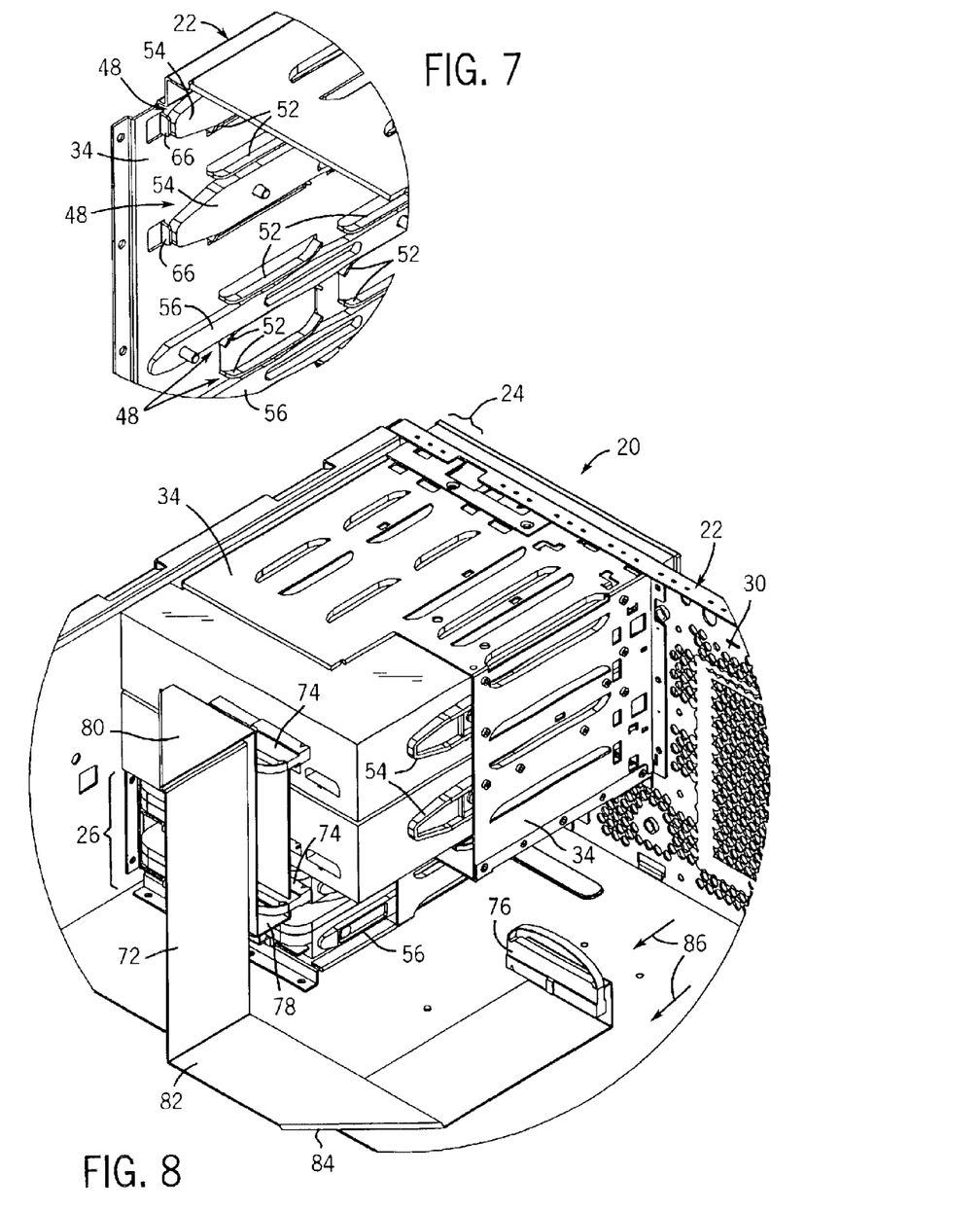
FIG. 7 is a perspective view of a rear portion of the chassis illustrated in FIG. 5.
FIG. 8 is a perspective view of an exemplary cable coupled to at least one media device in one selected orientation.

Additionally, one or more abutment members may be used to inhibit excess travel of one or more of the media devices when inserted into cavity 28 (see FIG. 7). In this exemplary embodiment, an abutment member 66 is disposed at a position to the rear of one or more rails, 54 and/or 56, to limit the extent of media device insertion. By way of example, the abutment member 66 may be a tab formed from a portion of the appropriate cavity wall 34 and bent inwardly to obstruct further travel of the corresponding rail and thus the media device.

Although an exemplary embodiment of chassis 22, cavity 28 and mounting features 48 have been described, the configuration of the features may change depending on the specific implementation and the desired media device orientations with respect to the chassis. For example, a variety of media devices having differing dimensions, e.g. differing width dimensions, may be designed for insertion and reorientation in a given chassis. Exemplary media devices comprise components such as compact disc read only memory (CD ROM) devices, digital video disc (DVD) devices, hard drives, floppy disk drives and tape backups. Also, each media device may comprise more than one of the components.

In the example illustrated in several figures, such as FIGS. 1, 2 and 4, media device 24 comprises a pair of components 68, such as CD ROM devices or DVD devices. One example of media device 26, on the other hand, comprises a pair of hard drives 70. However, media devices 24 and 26 also may comprise the same type of components but with different width dimensions. For example, media device 24 may comprise at least one hard drive and media device 26 may comprise at least one hard drive having a different width. The media devices also may comprise other similar components having different widths.

In one embodiment, media device 24 comprises a standard device in which the width of each component 68 is approximately 5.25 inches. The exemplary hard drives 70 have a standard width of approximately 3.5 inches. Thus, the external width dimension 46 of media device 26 is substantially different than the external width dimension 42 of media device 24. However, even though the widths of the devices substantially vary, the unique, space-efficient design of cavity 28 permits both media devices 24 and 26 to be transitioned between orientations, e.g. a deskside orientation and a desktop orientation. In other implementations, media devices 24 and 26 may comprise at least one component having various non-standard widths. The media devices 24 and 26 also may comprise a combination of standard and nonstandard width dimensions.

Depending on the types of media devices employed, it can be beneficial to facilitate the dissipation or removal of heat.

Figure 9:
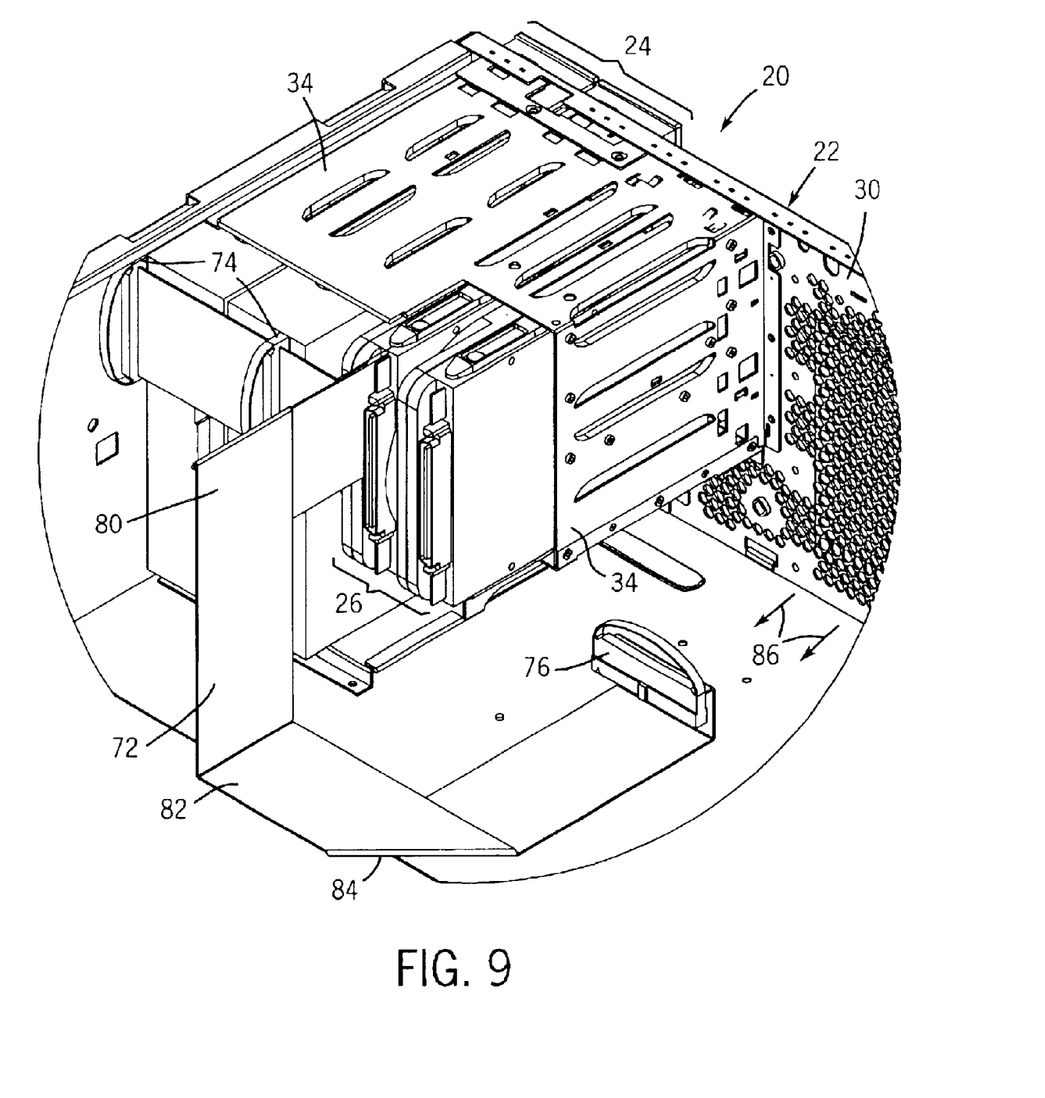
FIG. 9 is a perspective view of the cable system of FIG. 8 coupled to at least one media device in an alternate orientation.

Thus, in an exemplary embodiment illustrated in FIGS. 8 and 9, a cable 72, e.g. a ribbon cable, is utilized in a manner that does not adversely affect air flow across components within chassis 22.

Referring generally to FIG. 8, cable 72 is coupled to media device 24 via connectors 74. Cable 72 extends from connectors 74 to a distal connector 76 utilized to couple the media devices into the overall system. Depending on the type of media device 26 utilized in the system, a similar folded cable can be used for media device 26 such that air flow is not adversely impeded. In the embodiment illustrated in FIG. 8, chassis 22 is in a desktop orientation, and cable 72 is folded at a plurality of fold areas 78, 80, 82 and 84 such that the broadest extent of the cable is generally parallel with the direction of air flow, indicated by arrows 86, through chassis 22.

When media devices 24 and 26 are reoriented with respect to chassis 22, cable 72 is readily folded such that air flow through chassis 22 is not adversely affected. As illustrated in FIG. 9, when the media devices are reoriented from a desktop orientation to a deskside orientation, cable 72 can be refolded at fold area 78 and refolded at fold area 80 to present cable 72 with its broadest dimension generally in line with the direction of air flow. Thus, an appropriate cable or cables is able to service media device 24 and/or media device 26 in either orientation without adversely affecting the air flow through chassis 22.

It will be understood that the foregoing description is of exemplary embodiments of the invention, and that the invention is not limited to the specific forms shown. For example, a variety of chassis types and styles can be utilized; different types of media devices may be combined, and each media device may comprise one or more components; the location and configuration of the cavity may change depending on the media devices utilized as well as the position and number of orientations that may be selected; and the various retention features may be adapted for the specific implementations.

What is claimed is:

1. A system for enabling installation of media devices, comprising:
   a first media device having a pair of opposed sides, wherein each opposed side includes a respective mounting structure, a first external width dimension defined by a distance between outer edges of the respective mounting structures;
   a second media device having a pair of opposed sides, wherein each opposed side includes a respective mounting structure, a second external width dimension defined by a distance between outer edges of the respective mounting structures, the second external width dimension being different than the first external width dimension; and
   a chassis having an internal cavity defined by a plurality of walls, the plurality of walls having a plurality of mounting features to hold the first media device and the second media device in a plurality of orientations relative to the chassis.

2. The system as recited in claim 1, wherein the plurality of walls define a pair of cavity extensions disposed generally at a right angle with respect to each other.

3. The system as recited in claim 1, wherein the first external width dimension is 5.25 inches.

4. The system as recited in claim 3, wherein the second external width dimension is 3.5 inches.

5. The system as recited in claim 1, wherein the first media device comprises at least one compact disc read only memory (CD ROM) device.

6. The system as recited in claim 5, wherein the second media device comprises at least one CD ROM device.

7. The system as recited in claim 1, wherein the first media device comprises at least one digital video disc (DVD) device.

8. The system as recited in claim 7, wherein the second media device comprises at least one DVD device.

9. The system as recited in claim 1, wherein the first media device comprises at least one hard drive.

10. The system as recited in rein the second media device comprises at least one hard drive.

11. The system as recited in claim 1, wherein the second media device comprises at least one hard drive.

12. The system as recited in claim 1, wherein the plurality of orientations comprise a desktop orientation and a deskside orientation.

13. A system for facilitating placement of media devices, comprising:
    a chassis having a plurality of mounting features;
    a first media device having an external width dimension;
    a second media device having an external width dimension different from that of the first media device; and
    an opening formed within the chassis and adapted to receive the first media device and the second media device, the opening having a pair of extensions each having a transverse dimension corresponding to the external width dimension of the second media device.

14. The system as recited in claim 13, wherein the opening is shaped to permit parallel insertion of the first media device and the second media device in one of two positions, the positions being oriented at right angles with respect to each other.

15. The system as recited in claim 13, comprising a cable couplable to at least one of the first media device and the second media device without adversely affecting airflow regardless of the orientation of the first media device and the second media device.

16. The system as recited in claim 13, wherein the mounting features comprise slots formed in the chassis and rails coupled to the first media device and the second media device.

17. The system as recited in claim 16, wherein each rail comprises a retention feature.

18. The system as recited in claim 13, wherein the pair of extensions are disposed generally at right angles with respect to each other.

19. The system as recited in claim 13, wherein the chassis and the plurality of mounting features enable direct coupling of each of the first media device and the second media device in a plurality of orientations relative to the chassis.

20. The system as recited in claim 13, wherein the external width dimension of the second media device is 3.5 inches.

21. The system as recited in claim 13, wherein the first media device has an external width of 5.25 inches.

22. The system as recited in claim 13, wherein the chassis comprises a computer chassis.

23. A method for positioning media devices, comprising:
    reorienting a first media device within a cavity in a computer chassis from a first position to a second position that is generally perpendicular to the first position, wherein the first media device has a first width and wherein the width of the cavity in the first position and the second position generally corresponds to the first width; and
    moving a second media device, having a second width different than the first width from a third position to fourth position located within a portion of the cavity vacated by the first media device during reorienting of the first media device, wherein the width of the cavity in the third position and the fourth position generally corresponds to the second width.

24. The method as recited in claim 23, comprising positioning a media device cable in a manner that substantially facilitates the same airflow regardless of the orientation of the first media device and the second media device.

25. The method as recited in claim 23, wherein moving comprises rotating the second media device approximately 90 degrees with respect to the chassis.

26. A chassis, comprising:
   a chassis having a plurality of walls defining an L-shaped cavity with a main cavity portion and a pair of cavity extensions formed generally in a right angle to permit selective insertion of media devices in a plurality of orientations.

27. The chassis as recited in claim 26, further comprising:
   a first media device disposed in the main cavity portion and one of the pair of cavity extensions; and
   a second media device having a width different than that of the first media device, the second media device being positioned in the other of the pair of cavity extensions.

28. The chassis as recited in claim 27, wherein the second media device comprises at least one hard drive.

29. The chassis as recited in claim 26, wherein the chassis comprises a computer chassis having a plurality of slides positioned to slidably receive a pair of media devices in at least two orientations within the cavity.

* * * * *